Figure 1:
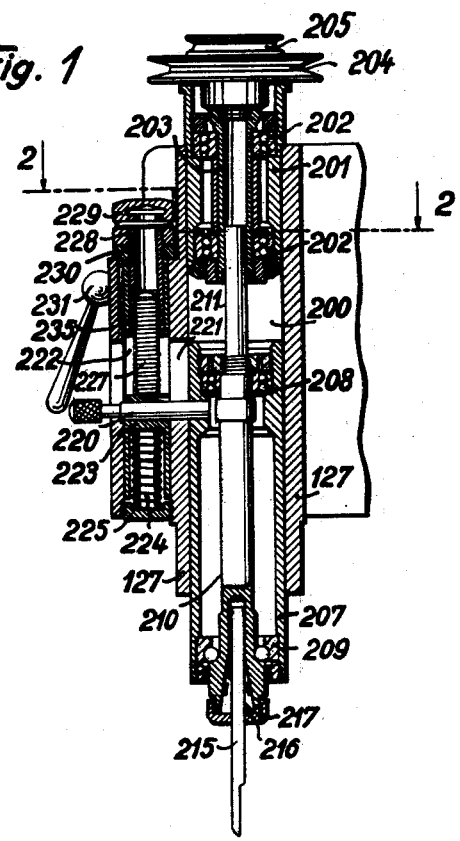

Oct. 31, 1939. K. ZWICK 2,178,130
TOOL SPINDLE FOR ENGRAVING AND COPYING MACHINES
Original Filed March 28, 1936

Inventor:
Kurt Zwick by Cumpston & Shepard
his Attorneys

Patented Oct. 31, 1939

2,178,130

UNITED STATES PATENT OFFICE 2,178,130

TOOL SPINDLE FOR ENGRAVING AND COPYING MACHINES

Kurt Zwick, Munich, Germany, assignor to Friedrich Deckel, Munich-Prince Ludwigshohe, Bavaria, Germany Original application March 28, 1936, Serial No. 71,483. Divided and this application April 16, 1938, Serial No. 202,569

7 Claims. (Cl. 90—16)

This invention deals with a tool spindle construction for use in various machines, especially engraving and copying machines, using these words in a broad sense as including die sinking machines.

An object of the invention is the provision of a generally improved and more satisfactory tool spindle construction.

Another object is the provision of a tool spindle construction so designed that the tool may be lifted from the surface of the work whenever desired, without elevating the holder or support in which it is mounted, and may later be brought back to exactly the same elevation in which it was formerly located.

A further object is the provision of a tool spindle construction having improved means for close adjustment of the elevation of the tool.

To these and other ends the invention resides in certain improvements and combinations of parts, all as will be hereinafter more fully described, the novel features being pointed out in the claims at the end of the specification.

Figure 2:
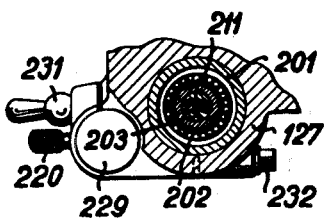

In the drawing:

Fig. 1 is a vertical section through a tool spindle and associated parts, constructed in accordance with a preferred embodiment of the invention, and Fig. 2 is a horizontal section taken substantially on the line 2—2 of Fig. 1.

The same reference numerals throughout the several views indicate the same parts.

The present application is a division of my parent United States patent application, Serial No. 71,483, filed March 28, 1936, for Engraving and copying machine.

The tool spindle assembly of the present invention is mounted on any suitable support or holder, such as a pantograph linkage or a parallel motion beam of an engraving or copying machine, or the like. A fragment of a holder which may be mounted on or integral with such a linkage or beam is indicated at 127, the holder being provided with a vertical bore or socket 200. Fixed in the upper end of this bore 200 is a sleeve 201 having suitable bearings 202 (preferably ball bearings) for holding a rotatable tube 203, the upper end of which is provided with a driving pulley having belt grooves 204 and 205.

Vertically slidable in the lower part of the bore 200 is a sleeve 207 having ball bearings 208 and 209 for supporting a rotatable spindle 210. The spindle is connected to and driven from the rotating tube 203 by suitable means such as an upward extension 211 at the top of the spindle 210, which extension is of non-circular cross section, as shown in Fig. 2, and which fits slidably into a similarly shaped part at the bottom of the tube 203. The sleeve 207, spindle 210 and extension 211 may slide upwardly and downwardly relatively to the sleeves 201 and 203, but the spindle 210 is at all times non-rotatably connected to the driving sleeve 203 and is driven therefrom whenever the driving sleeve is rotated.

At the lower end of the spindle 210 is a socket which may receive, as desired, either a cutting tool 215 or a tracing stylus, either of which may be clamped in the spindle socket by suitable means, such as a collet or split collar 216 and a clamping nut 217.

To control the vertical movements of the sleeve 207 and spindle 210 within the bore 200, a control pin 220 is secured to the sleeve 207 and projects laterally through a slot 221 in one side of the holder 127 and outwardly to an accessible external head which may be grasped when desired to raise or lower the spindle. Intermediate its length, the spindle 220 passes through a small vertical bore 222 formed in an extension of the holder 127, and through a member 223 slidable vertically in this bore. The lower end of the member 223 is hollowed out to form a cavity in which is placed a spring 224 pressing at its upper end against the member 223 and reacting at its lower end against a cap 225 threaded into and closing the lower end of the bore 222. The spring constantly tends to raise the member 223 and with it to raise the sleeve 207 and the spindle 210.

The upper end of the member 223 is in the form of a screw threaded shank 227 which is engaged by screw threads on the inner surface of the sleeve 228 having a head 229 accessible above the top of the bore 222, which head 229 may be turned by hand for purposes of adjustment. The threaded sleeve 228 is rotatable within but held against vertical movement relatively to a second sleeve 230 which is slidable vertically in the bore 222 and which may be held in any desired position within this bore by a clamp 231 which, when tightened, slightly reduces the diameter of the upper end of the bore in order to clamp the sleeve 230 therein. The walls forming the upper end of the bore may be longitudinally slotted or split in order that the clamp 231 may readily act on the sleeve 230. The walls of the member 127 surrounding the lower end of the bore 200 may also be longitudinally slotted or split, and a clamp 232 is provided to draw the walls together to clamp the sleeve 207 tightly and immovably within the bore 200. Although the sleeve 230 is vertically slidable in the bore 222 when the clamp 231 is loosened, it is held against rotation therein by any suitable means, such as a pin 235 seated in the sleeve 230 and projecting laterally therefrom into a vertical slot in the wall of the bore 222.

In operation, when the clamp 231 is tightened to hold the sleeve 230 against vertical movement in the bore 222, and when the clamp 232 is loosened to allow vertical movement of the sleeve 207, then the head 229 may be rotated to turn the sleeve 228 relatively to the screw threads 227, thus raising or lowering the tool spindle 210 as required. This provides a very fine or close adjustment of the height of the tool spindle, enabling the cutting end of the tool to be placed at exactly the right elevation relatively to the work being operated upon or relatively to the member 127. When the tool has been placed in the intended position, it may be maintained in this position by tightening the clamp 232.

If it is desired to raise the tool away from the work for a time, and later return it to precisely the same position it formerly occupied, this may be done by loosening both of the clamps 231 and 232, whereupon the spring 224 will raise the sleeve 207 and the tool 215, for the sleeve 230 is now free to rise in its bore 222. To return the spindle and tool to exactly the former elevation, downward force is applied to the cap 229 or pin 220 or both, pushing these parts downwardly until the annular flange at the top of sleeve 230 rests upon the top of the fixed wall surrounding the bore 222. Then the clamps 231 and 232 may be tightened, and the spindle will be at the same location which it occupied before it was raised. If further adjustment of the tool is desired, the clamp 232 may be loosened while the clamp 231 remains tight and the elevation of the tool may be changed by turning the adjusting head 229.

The tool may also be raised from the work or moved downwardly into contact therewith, in certain types of machines, by raising or lowering the entire member 127.

The tool spindle is driven from any suitable source of power, as by means of a belt running in the belt groove 204 or the groove 205.

While one embodiment of the invention has been disclosed, it is to be understood that the inventive idea may be carried out in a number of ways. This application is therefore not to be limited to the precise details described, but is intended to cover all variations and modifications thereof falling within the spirit of the invention or the scope of the appended claims.

I claim:

1. A tool spindle assembly for an engraving or copying machine, comprising a holder having a bore therein, a sleeve mounted for longitudinal movement within said bore, a tool spindle rotatably mounted in said sleeve for bodily longitudinal movement therewith, means for clamping said sleeve in a fixed position in said bore, spring means tending to move said sleeve in one direction in said bore, and adjustable screw means for determining the position to which said sleeve is moved by said spring means when said clamping means is unclamped.

2. A tool spindle assembly for an engraving or copying machine, comprising a holder having a bore therein, a sleeve mounted for longitudinal movement within said bore, a tool spindle rotatably mounted in said sleeve for bodily longitudinal movement therewith, means for clamping said sleeve in a fixed position in said bore, spring means tending to move said sleeve in one direction in said bore, a second bore, a member mounted for movement in said second bore in a direction approximately parallel to the longitudinal movements of said sleeve, means for clamping said member against such movement in said second bore, and adjustable screw-threaded means operatively connecting said member to said sleeve to adjust the position of said sleeve in the first mentioned bore when said member is clamped in said second bore and said sleeve is unclamped in its bore.

3. A tool spindle assembly for an engraving or copying machine, comprising a holder having a bore therein, a sleeve mounted for longitudinal movement within said bore, a tool spindle rotatably mounted in said sleeve for bodily longitudinal movement therewith, a driving spindle rotatably mounted in said bore and held against substantial longitudinal movement therein, longitudinally slidable means non-rotatably connecting one spindle to the other to drive said tool spindle from rotation of said driving spindle notwithstanding longitudinal movements of said tool spindle, releasable clamping means for holding said sleeve against longitudinal movement within said bore, a member movable relative to said holder in a direction approximately parallel to the longitudinal movements of said sleeve, means for releasably clamping said member against such movement, and adjustable screw-threaded means operatively connecting said member to said sleeve to adjust the position of said sleeve in its bore when it is unclamped therein and when said member is clamped against said movement relative to said holder.

4. A tool spindle assembly for engraving or copying machines, including means forming a bore, a spindle sleeve slidable in said bore, releasable means for clamping said sleeve immovably in said bore, a tool spindle mounted in and rotatable within said sleeve, a second sleeve mounted for movement in a direction substantially parallel to the movement of said spindle sleeve, releasable means for clamping said second sleeve against movement in said direction, and means operatively connecting said spindle sleeve to said second sleeve to control the position of said spindle sleeve, when it is unclamped, by the position of said second sleeve.

5. A tool spindle assembly for engraving or copying machines, including means forming a bore, a spindle sleeve slidable in said bore, releasable means for clamping said sleeve immovably in said bore, a tool spindle mounted in and rotatable within said sleeve, a second sleeve mounted for movement in a direction substantially parallel to the movement of said spindle sleeve, releasable means for clamping said second sleeve against movement in said direction, and adjustable screw means operatively connecting said spindle sleeve to said second sleeve, said spindle sleeve, second sleeve, and screw means all being shiftable bodily together when both of said sleeves are unclamped, and the position of said spindle sleeve being capable of fine adjustment by unclamping said spindle sleeve, clamping said second sleeve, and operating said screw means to shift said spindle sleeve relatively to the clamped second sleeve.

6. A tool spindle assembly for engraving or copying machines, including means forming a bore, a spindle sleeve slidable in said bore, a tool spindle mounted in and rotatable within said sleeve, screw thread means operatively connected to said spindle sleeve and having a thread axis extending in a direction substantially parallel to the direction of movement of said sleeve, second screw thread means threadedly engaged with said first named screw thread means, one of said thread means being rotatable relatively to the other, and means for releasably holding said second thread means against axial movement, so that when said second thread means is thus held, rotation of one of said thread means relatively to the other will move said spindle sleeve in said bore, and when said second thread means is released, said first and second thread means and said sleeve may move bodily together.

7. A construction as described in claim 6, further including abutment means for limiting axial movement of said second thread means in one direction, so that when said second thread means is released and moved axially away from said abutment means to move said sleeve without rotation of said thread means, said sleeve may be restored to its initial position by moving said second thread means back into contact with said abutment means.

KURT ZWICK.